United States Patent
Chiu et al.

(10) Patent No.: US 10,152,695 B1
(45) Date of Patent: Dec. 11, 2018

(54) MACHINE LEARNING BASED SYSTEM AND METHOD OF CALCULATING A MATCH SCORE AND MAPPING THE MATCH SCORE TO A LEVEL

(71) Applicant: Elance, Inc., Mountain View, CA (US)

(72) Inventors: Kwan-Min Chiu, Fremont, CA (US); Fabio Rosati, Palo Alto, CA (US); Yuet Ping Poon, Cupertino, CA (US); Megan Emily Kamil, Belmont, CA (US)

(73) Assignee: Elance, Inc., Mountain View, CA (US)

( * ) Notice: Subject to any disclaimer, the term of this patent is extended or adjusted under 35 U.S.C. 154(b) by 971 days.

(21) Appl. No.: 14/520,226

(22) Filed: Oct. 21, 2014

Related U.S. Application Data

(63) Continuation-in-part of application No. 13/837,826, filed on Mar. 15, 2013, now Pat. No. 9,117,180.

(60) Provisional application No. 61/894,357, filed on Oct. 22, 2013.

(51) Int. Cl.
| | |
|---|---|
| *G06F 15/18* | (2006.01) |
| *G06Q 10/10* | (2012.01) |
| *G06F 17/30* | (2006.01) |
| *G06N 99/00* | (2010.01) |

(52) U.S. Cl.
CPC ..... *G06Q 10/1053* (2013.01); *G06F 17/3053* (2013.01); *G06F 17/30554* (2013.01); *G06N 99/005* (2013.01)

(58) Field of Classification Search
CPC .................................................. G06Q 10/1053
USPC ............................................. 706/15, 45, 12
See application file for complete search history.

(56) References Cited

U.S. PATENT DOCUMENTS

| | | |
|---|---|---|
| 6,208,659 B1 | 3/2001 | Govindarajan et al. |
| 6,385,620 B1 | 5/2002 | Kurzius et al. |
| 6,591,011 B1 | 7/2003 | Nielsen |
| 6,618,734 B1 | 9/2003 | Williams |
| 6,662,194 B1 | 12/2003 | Joao |
| 6,735,570 B1 | 5/2004 | Lacy et al. |
| 6,859,523 B1 | 2/2005 | Jilk |
| 6,871,181 B2 | 3/2005 | Kansai |
| 6,931,385 B1 | 8/2005 | Halstead et al. |
| 7,096,193 B1 | 8/2006 | Beaudoin et al. |

(Continued)

OTHER PUBLICATIONS

Paaolucci al., "Semantic Matching of Web Services Capabilities", 2002, Carnegie Mellon University, Pittsburgh, PA, USA.

(Continued)

*Primary Examiner* — David R Vincent
(74) *Attorney, Agent, or Firm* — Haverstock & Owens LLP

(57) ABSTRACT

Embodiments of the present invention are directed to a system and method of calculating a match score and mapping the match score to a level. Interested contractors in a list are ranked based on a rank score that is calculated for each of the interested contractor using a set of factors. The rank score is a combination of factor scores associated with the factors. A mapping engine, implementing a machine learning model, maps each of the interested contractors to one of at least two levels based on the set of factor scores, by comparing the set of factor scores to historical data collected to determine the likelihood of the contractor having that set being chosen by the client. Any interested contractor who has been mapped to the highest level is distinguished from others in the list. The mapping engine continuously learns from the historical data to improve future mappings.

18 Claims, 9 Drawing Sheets

(56) References Cited

U.S. PATENT DOCUMENTS

| | | |
|---|---|---|
| 7,466,810 B1 | 12/2008 | Quon et al. |
| 7,505,919 B2 | 3/2009 | Richardson |
| 7,752,080 B1 | 7/2010 | Greener |
| 7,814,085 B1 | 10/2010 | Pfleger et al. |
| 8,024,670 B1 | 9/2011 | Rahmatian |
| 8,156,051 B1 | 4/2012 | Shah |
| 8,224,755 B2 | 7/2012 | Goodman et al. |
| 8,380,709 B1 | 2/2013 | Diller et al. |
| 8,504,403 B2 | 8/2013 | Deich |
| 8,512,143 B2 | 8/2013 | Jung et al. |
| 8,517,742 B1 | 8/2013 | Johnson |
| 8,682,683 B2 | 3/2014 | Ananian |
| 8,843,388 B1 | 9/2014 | Westfall |
| 8,856,670 B1 | 10/2014 | Thakur et al. |
| 9,020,271 B2 | 4/2015 | Deolalikar et al. |
| 9,454,576 B1 | 9/2016 | Kapoor |
| 2001/0034630 A1 | 10/2001 | Mayer et al. |
| 2001/0034688 A1 | 10/2001 | Annunziata |
| 2001/0041988 A1 | 11/2001 | Lin |
| 2002/0010685 A1 | 1/2002 | Ashby |
| 2002/0052773 A1 | 5/2002 | Kraemer |
| 2002/0054138 A1 | 5/2002 | Hennum |
| 2002/0103687 A1 | 8/2002 | Kipling |
| 2002/0120554 A1 | 8/2002 | Vega |
| 2002/0161707 A1 | 10/2002 | Cole et al. |
| 2003/0004738 A1 | 1/2003 | Chandar |
| 2003/0014294 A1 | 1/2003 | Yoneyama et al. |
| 2003/0050811 A1 | 3/2003 | Freeman, Jr. |
| 2003/0086608 A1 | 5/2003 | Frost |
| 2003/0097305 A1 | 5/2003 | Ogino et al. |
| 2003/0191684 A1 | 10/2003 | Lumsden et al. |
| 2003/0212246 A1 | 11/2003 | Eleveld |
| 2003/0212627 A1 | 11/2003 | Burns et al. |
| 2003/0220843 A1 | 11/2003 | Lam et al. |
| 2004/0064436 A1 | 4/2004 | Breslin et al. |
| 2004/0103167 A1 | 5/2004 | Grooters et al. |
| 2004/0128224 A1 | 7/2004 | Dabney et al. |
| 2004/0215560 A1 | 10/2004 | Amalraj et al. |
| 2004/0230511 A1 | 11/2004 | Kannan et al. |
| 2004/0243428 A1 | 12/2004 | Black |
| 2005/0033633 A1 | 2/2005 | LaPasta |
| 2005/0043998 A1 | 2/2005 | Bross et al. |
| 2005/0222907 A1 | 10/2005 | Pupo |
| 2006/0031177 A1 | 2/2006 | Rule |
| 2006/0080116 A1 | 4/2006 | Maguire |
| 2006/0143228 A1 | 6/2006 | Odio-Paez |
| 2006/0177041 A1 | 8/2006 | Warner et al. |
| 2006/0195428 A1 | 8/2006 | Peckover |
| 2006/0212359 A1 | 9/2006 | Hudgeon |
| 2006/0284838 A1 | 12/2006 | Tsatalos |
| 2007/0022040 A1 | 1/2007 | Gordon |
| 2007/0061144 A1 | 3/2007 | Grichnik et al. |
| 2007/0112671 A1 | 5/2007 | Rowan |
| 2007/0130059 A1 | 6/2007 | Lee et al. |
| 2007/0174180 A1 | 7/2007 | Shin |
| 2007/0192130 A1 | 8/2007 | Sandhu |
| 2007/0233510 A1 | 10/2007 | Howes |
| 2008/0059267 A1 | 3/2008 | Hamilton |
| 2008/0059523 A1 | 3/2008 | Schmidt et al. |
| 2008/0134292 A1 | 6/2008 | Ariel et al. |
| 2008/0154783 A1 | 6/2008 | Rule et al. |
| 2008/0194228 A1 | 8/2008 | Pousti et al. |
| 2008/0288582 A1 | 11/2008 | Pousti et al. |
| 2008/0313005 A1 | 12/2008 | Nessland et al. |
| 2009/0011395 A1 | 1/2009 | Schmidt et al. |
| 2009/0055404 A1 | 2/2009 | Heiden et al. |
| 2009/0055476 A1 | 2/2009 | Marcus et al. |
| 2009/0132345 A1 | 5/2009 | Meyssami et al. |
| 2009/0150386 A1 | 6/2009 | Lichtblau |
| 2009/0210282 A1 | 8/2009 | Elenbaas et al. |
| 2009/0241035 A1 | 9/2009 | Tseng et al. |
| 2009/0288021 A1 | 11/2009 | Ioffe et al. |
| 2010/0017253 A1 | 1/2010 | Butler et al. |
| 2010/0144318 A1 | 6/2010 | Cable |
| 2010/0161503 A1 | 6/2010 | Foster |
| 2010/0162167 A1 | 6/2010 | Stallings et al. |
| 2010/0287525 A1 | 11/2010 | Wagner |
| 2011/0106762 A1 | 5/2011 | Dane et al. |
| 2011/0208665 A1 | 8/2011 | Hirsch |
| 2011/0302053 A1 | 12/2011 | Rigole |
| 2012/0143952 A1 | 6/2012 | Von Graf |
| 2012/0150761 A1 | 6/2012 | Ananian |
| 2013/0325734 A1 | 12/2013 | Bixler et al. |
| 2014/0074738 A1 | 3/2014 | Thankappan et al. |
| 2014/0164271 A1 | 6/2014 | Forman et al. |
| 2014/0377723 A1 | 12/2014 | Strong |
| 2016/0012135 A1 | 1/2016 | Wang et al. |

OTHER PUBLICATIONS

Muhl, Charles J. "What Is an Employee—The Answer Depends on the Federal Law." Monthly Lab. Rev. 125(2002): 9 pages.

Barton, Lisa Horwedel "Reconciling the independent contractor versus employee dilemma: a discussion of current developments as they relate to employee benefit plans." Cap. UL Rev 29 (2001): 63 pages.

Moran, Jenna Amato "Independent Contractor or Employee—Misclassification of Workers and Its Effect of the State." Buff. Pub. Int. LJ 28 (2009): 28 pages.

Webb, Teresa J., et al. "An empirical assist in resolving the classification dilemma of workers as either employees or independent contractors." Journal of Applied Business Research (JABR) 24. (2011): 22 pages.

Wood, Robert W. "Defining Employees and Independent Contractors." Bus. L. Today 17 (2007): 6 pages.

| Function | Role | Skills |
|---|---|---|
| → Engineering | → Web Developer | PHP |
| Product | Mobile Developer | HTML |
| Sales | QA Engineer | Javascript |
| Marketing | ⋮ | CSS |
| ⋮ | | |

1000 ⟶

56 proposals received for "website for Danny's Donuts"          1010          Sort ▼   1060

1. ⧙ Dominoes  -- 1020                          Best Match -- 1050
   Proposal -- 1025                             ☏ 💬 ✎ ⎤-1045
   Mon Oct 7, 2013      7:45 am -- 1030
   ——————————————
   ——————————————  ⎤-1035                                                   ⎤ 1015a
   ——————————————
   Rate: $25/hr      Earnings: $121,308 ⎤-1040

2. ⧙ Mighty Site Builder
   Proposal                                     ☏ 💬 ✎
   Mon Oct 7, 2013      9:32 am
   ——————————————
   ——————————————                                                          ⎤ 1015b
   ——————————————
   Rate: $29/hr      Earnings: $52,211

3. ⧙ Cinderelly Creations                       Good Match-- 1055
   Proposal                                     ☏ 💬 ✎
   Mon Oct 6, 2013      8:43 pm                 ┌──────────────────┐
   ——————————————                               │ Feedback ★★★★☆   │
   ——————————————                               │ Rate: In range   │       ⎤ 1015c
   ——————————————                               │ Location: Houston, TX │
   Rate: $30/hr      Earnings: $92,279          │ Skills: PHP, JavaScript │
                                         1060⎯⎯ │ •••              │
                                               └──────────────────┘

4. ⧙ Sugar Cubes                                Best Match
   Proposal                                     ☏ 💬 ✎
   Mon Oct 6, 2013      4:45 p.m.
   ——————————————
   ——————————————                                                          ⎤ 1015d
   ——————————————
   Rate: $30/hr      Earnings: $100,180

MACHINE LEARNING BASED SYSTEM AND METHOD OF CALCULATING A MATCH SCORE AND MAPPING THE MATCH SCORE TO A LEVEL

RELATED APPLICATION

This patent application claims priority under 35 U.S.C. § 119(e) of U.S. Provisional Patent Application Ser. No. 61/894,357, filed Oct. 22, 2013, and titled "MATCH SCORE," which is hereby incorporated by reference.

This patent application is a continuation in part of the co-pending U.S. patent application Ser. No. 13/837,826, filed Mar. 15, 2013, entitled "A MATCHING METHOD BASED ON A MACHINE LEARNING ALGORITHM AND A SYSTEM THEREOF," which is hereby incorporated by reference.

FIELD OF THE INVENTION

The present invention relates to an improved system and method of calculating a match score and mapping the match score to a level, based on a machine learning algorithm.

BACKGROUND OF THE INVENTION

A traditional hiring process is a long and cumbersome. FIG. 1 illustrates the traditional hiring process 100. Assume a client has a job to fill and a contractor is looking to fill a job vacancy. At a step 105a, the client creates and publishes a job posting for the job opening. The creation of the job posting can be a tedious process, especially if the client is not familiar with the job. If the client does not know the skills associated the job, the client might create a job posting that lacks information for one to fully understand what the job entails. At a step 110a, the client passively waits for resumes or proposals submitted in response to the job posting. At a step 115a, if the client does not receive resumes or proposals or qualified ones, the client would need to pro-actively reach out to candidates. There are many reasons why the client does not receive resumes or proposals in response to the job posting. For example, an incomplete job posting might not be meaningfully returned as a part of a search result and/or understood by contractors when making decisions to apply or not.

At a step 105b, a contractor searches for job openings or leads. In a bad economy when job openings are scarce, the contractor may need to search for some time until the contractor finds something worthwhile. At a step 110b, after the contractor finally finds a job opening, the contractor drafts a resume or a proposal tailored to the job opening. At a step 115b, the contractor sends the resume or proposal to the job opening.

At a step 120, the client evaluates all the resumes and/or proposals the client has received after a certain period of time. A problem associated with the step 120 is that the client can spend a lot of time evaluating these resumes and/or proposals. Time is wasted when the client evaluates resumes and/or proposals from contractors who are, for example, unqualified or difficult to work with, etc. At a step 125, the client interviews some or all of the candidates. At a step 130, the client performs negotiations with the candidates. At a step 135, the client makes hiring decisions. At a step 140, the client and/or the contractor hope for a success.

The traditional hiring process 100 is a stop and go process due to the amount of waiting it takes after each step and can take weeks, if not months, to fill a job opening. Even when the opening is filled, there is no predictability in the result in regards to whether the client will be satisfied with the hired contractor or vice versa. For example, the client and the hired contractor might find it difficult to work with each other because they are in different time zones, or the client likes to micro-manage while the hired contractor prefers to be macro-managed. The traditional hiring process 100 does not provide trustworthy results as trust issues exist in the traditional hiring process 100.

The present invention addresses at least these limitations in the prior art.

SUMMARY OF THE INVENTION

Some embodiments of the present invention are directed to a system and method of calculating a match score for interested contractors and mapping the match score to a level to assist a client in distinguishing those proposals that may potentially be worthwhile to review than from the other received proposals. An interested contractor is one who had previously submitted a proposal to the job post published by the client. Interested contractors in a list are ranked based on a rank score that is calculated for each of the interested contractor using a set of factors. The rank score for an interested contractor is a combination of factor scores associated with the factors. A mapping engine, implementing a machine learning model, maps each of the interested contractors to one of at least two levels based on the set of factor scores associated with that contractor, by comparing the set of factor scores to historical data collected by the system to determine the likelihood of the contractor (and the submitted proposal) having that set of factor scores being chosen by the client. Any of the interested contractors who have been mapped to the highest level is visually distinguished from the others in the list. The mapping engine is configured to continuously learn from the historical data to improve future mappings.

In one aspect, a non-transitory computer-readable medium is provided. The non-transitory computer-readable medium stores instructions that, when executed by a computing device, cause the computing device to perform a method. The method includes determining a rank score of each interested contractor who has submitted a proposal to an inquiry. The rank score is calculated from a plurality of factor scores associated with a plurality of factors, and is used to present interested contractors in an ordered manner to a client.

In some embodiments, each of the plurality of factors is associated with a weight. The weight can be manually tuned by a user, such as the client, or can be automatically tuned based on machine-learned importance through user behavior. In some embodiments, the weight is static or dynamic. In some embodiment, the weights are same for all the factors. Alternatively, the weights for the factors are all different. For example, a weight for a first factor of the plurality of factors is different from a weight for a second factor of the plurality of factors. In some embodiments, each of the factor scores is normalized between 0 and 1, although other ranges are contemplated.

The plurality of factors can include feedback, rate, location, skills and award ratio. More or less factors or metrics relevant to making a hiring decision are contemplated. In some embodiments, each of the plurality of factors is specified by the client. Alternatively, each of the plurality of factors is automatically selected based on learned behavior of the client.

The method also includes classifying each submitted proposal as one of at least two levels. In some embodiments, classifying each submitted proposal includes determining a percentage of likelihood of the submitted proposal being selected. The determination can be based on a set of the individual factor scores associated with the plurality of factors for the respective contractor. The percentage of likelihood of the submitted proposal being selected is determined using historical data collected in a services exchange medium. In some embodiments, classifying each submitted proposal also includes determining a percentage of likelihood of the interested contractor who submitted that proposal being able to deliver billable work The method also includes, based on the classification, visually distinguishing the submitted proposal from other submitted proposals. For example, a submitted proposal can be visually distinguished in a first manner upon the determination that the percentage of likelihood is above a first threshold, or can be visually distinguished in a second manner upon the determination that the percentage of likelihood is above a second threshold.

In some embodiments, a number of submitted proposals visually distinguished is limited. Alternatively, the number of submitted proposals visually distinguished is not limited.

In some embodiments, the method further includes, prior to determining a rank score, using predictive analysis to intelligently serve at least one contractor as a potential candidate to the client, and receiving a proposal from the potential candidate.

In another aspect, a system is provided. The system includes a server computer. The server computer is configured to present results related to a job posting. Typically, the results include an ordered listing of contractors that is determined by a rank score associated with each of the contractors.

The system also includes a set of factors scores that is associated with a plurality of factors. Typically, the factor scores are calculated for each of the contractors, and the rank score is a combination of the factor scores.

In some embodiments, each factor score is based on, at least, a factor weight and a personal factor value. The personal factor value is determined from a criteria calculation that is the same for all members. The personal factor value of a contractor calculated at T1 could be different from the personal factor value of the contractor calculated at T2.

The system also includes a mapping engine. The mapping engine accesses past data of all members to map each of the contractors to one of at least two levels based on the set of factor scores associated with that contractor. In some embodiments, the mapping engine implements a machine learning model to continuously learn from historical data collected by the system to improve future mappings.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

FIG. 10 illustrates an exemplary web page presented to a client in accordance with the present invention.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein or with equivalent alternatives.

Figure 7:
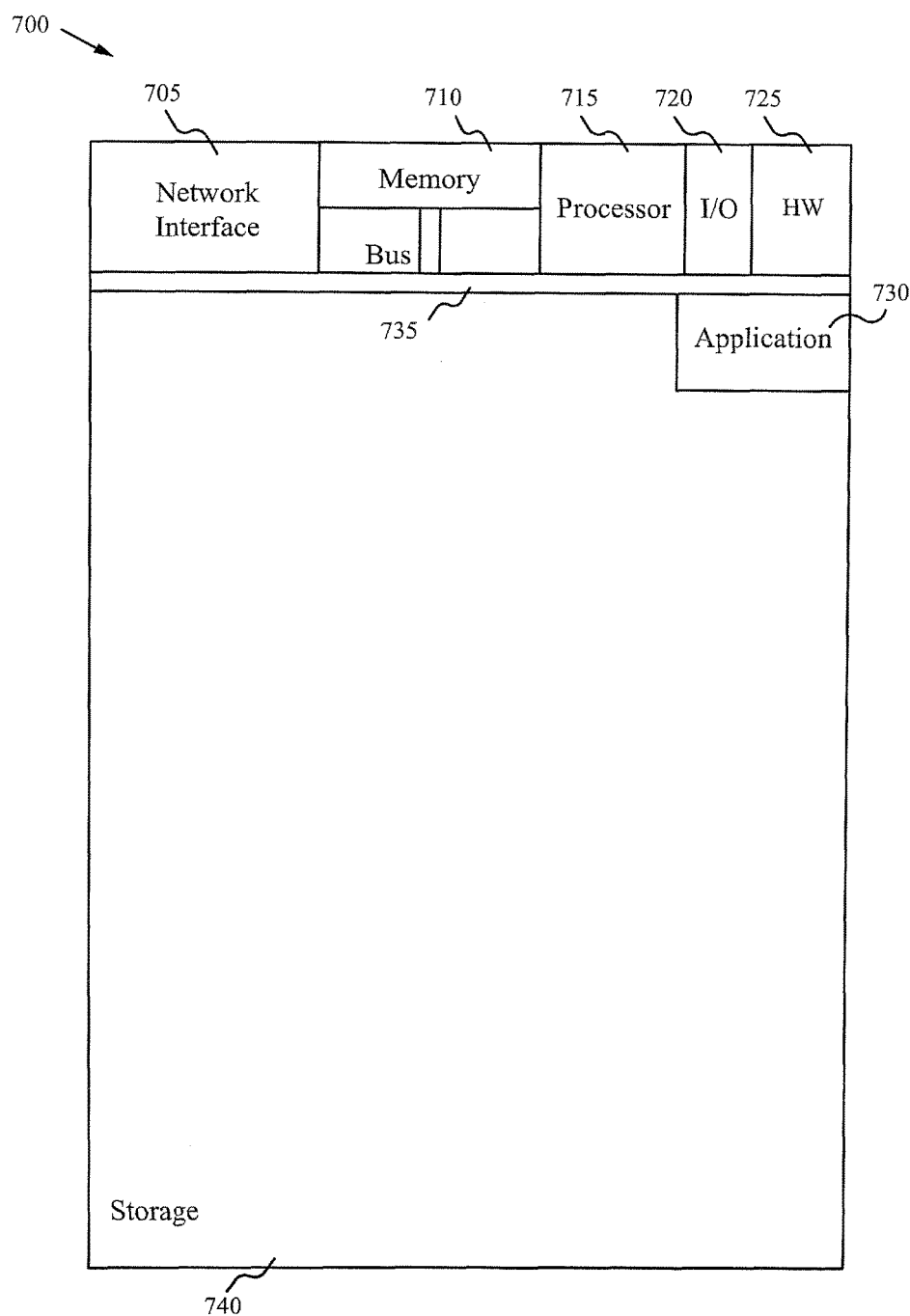
FIG. 7 illustrates a graphical representation of an exemplary computing device in accordance with the present invention.

FIG. 7 illustrates a graphical representation of an exemplary computing device in accordance with the present invention. The computing device 700 is able to serve, compute, communicate, generate and/or display highly relevant matches. For example, the computing device 700 is able to present qualified candidates to a client. For another example, the computing device 700 is able to present relevant business leads to a contractor. For another example, the computing device 700 is able to indicate best proposals submitted by contractors to the client.

In general, a hardware structure suitable for implementing the computing device 700 includes a network interface 705, a memory 710, processor 715, I/O device(s) 720, a bus 735 and a storage device 740. The choice of processor is not critical as long as the processor 715 has sufficient speed. The memory 710 is any conventional computer memory known in the art. The storage device 740 is a hard drive, CDROM, CDRW, DVD, DVDRW, flash memory card or any other storage device. The computing device is able to include one or more network interfaces 705. An example of a network interface includes a network card connected to an Ethernet or other type of LAN. The I/O device(s) 720 are able to include one or more of the following: keyboard, mouse, monitor, display, printer, modem and other devices. Software applications 730 are likely to be stored in the storage device 740 and memory 710 and are executed by the processor 715. Software applications 730 include an application configured to implement a recommendation engine and an application configured to implement a mapping engine. More or less components shown in FIG. 7 are able to be included in the computing device 700. In some embodiments, hardware 725 for implementing the recommendation engine is included. Although the computing device 700 in FIG. 7 includes applications 730 and hardware 725 for implementing the recommendation engine and the mapping engine, the recommendation engine and/or the mapping engine can be implemented on a computing device in hardware, firmware, software or any combination thereof.

Examples of suitable computing devices include a personal computer, laptop computer, computer workstation, a server, mainframe computer, mini-computer, handheld computer, personal digital assistant, cellular/mobile telephone, smart appliance, gaming console or any other suitable computing device.

Within the following discussion, the terms "client" and "buyer" refer to a member of an online community who is has a job opening, and are used interchangeably herein. Also, within the following discussion, the terms "contractor" and "service provider" refer to a member of the online community who is skilled and is looking for a job, and are used interchangeably herein.

Candidate Recommendations

Overview

Some embodiments of the present invention are directed to a matching method that implements a machine learning algorithm to serve one or more matches to an individual and to ensure that an outcome of each match is more likely than not to be successful. A recommendation engine uses the machine learning algorithm to perform predictive analysis to thereby select one or more members of an online community to match or pair with the individual, based on at least structured data, unstructured data or both of the individual and/or each selected member. The recommendation engine is configured to continuously learn from past user behavior, including the individual's, to further improve future matches provided to the individual.

For example, the present invention is able to pair workers to jobs quickly, allowing a client to hire an ideal match on the spot, such as in one Internet session. In other words, in one Internet session, the client is able to provide information about a job opening, be served with one or more candidates, and hire a candidate to start work during the time period indicated by the client. In some embodiments, the present invention factors in a client's job requirements, including behavior data, and based on predicative analysis of successful outcomes, quickly search through all candidates, reviewing and taking into consideration their requirements, to find ideal matches for the job instantaneously. In some embodiments, a successful outcome is defined by the client hiring a matched candidate and providing a good feedback for that candidate after the job is completed.

Hypothetically, assume Aaden, Abigail, Finn, Kristin, Aria and Ethan are all members of an online community, such as a services marketplace in which clients find and hire contractors to fill available job openings. Aaden is a client who has a job opening that needs to be filled right away. Abigail, Finn, Kristin, Aria and Ethan are contractors within the services marketplace and have created online profiles, which include job histories describing previous and current jobs held online, offline, or both. An exemplary online profile is discussed in U.S. patent application Ser. No. 12/474,127, entitled "Online Professional Services Storefront," filed on May 28, 2009, which is hereby incorporated by reference. While Abigail, Kristin, Aria and Ethan are seasoned contractors within the services marketplace, Finn is a new contractor who has not yet looked for a job within the services marketplace. Aria, Abigail, Finn and Kristin have all indicated that they will be available to start work right away. However, Ethan has indicated that he is currently unavailable.

Figure 1:
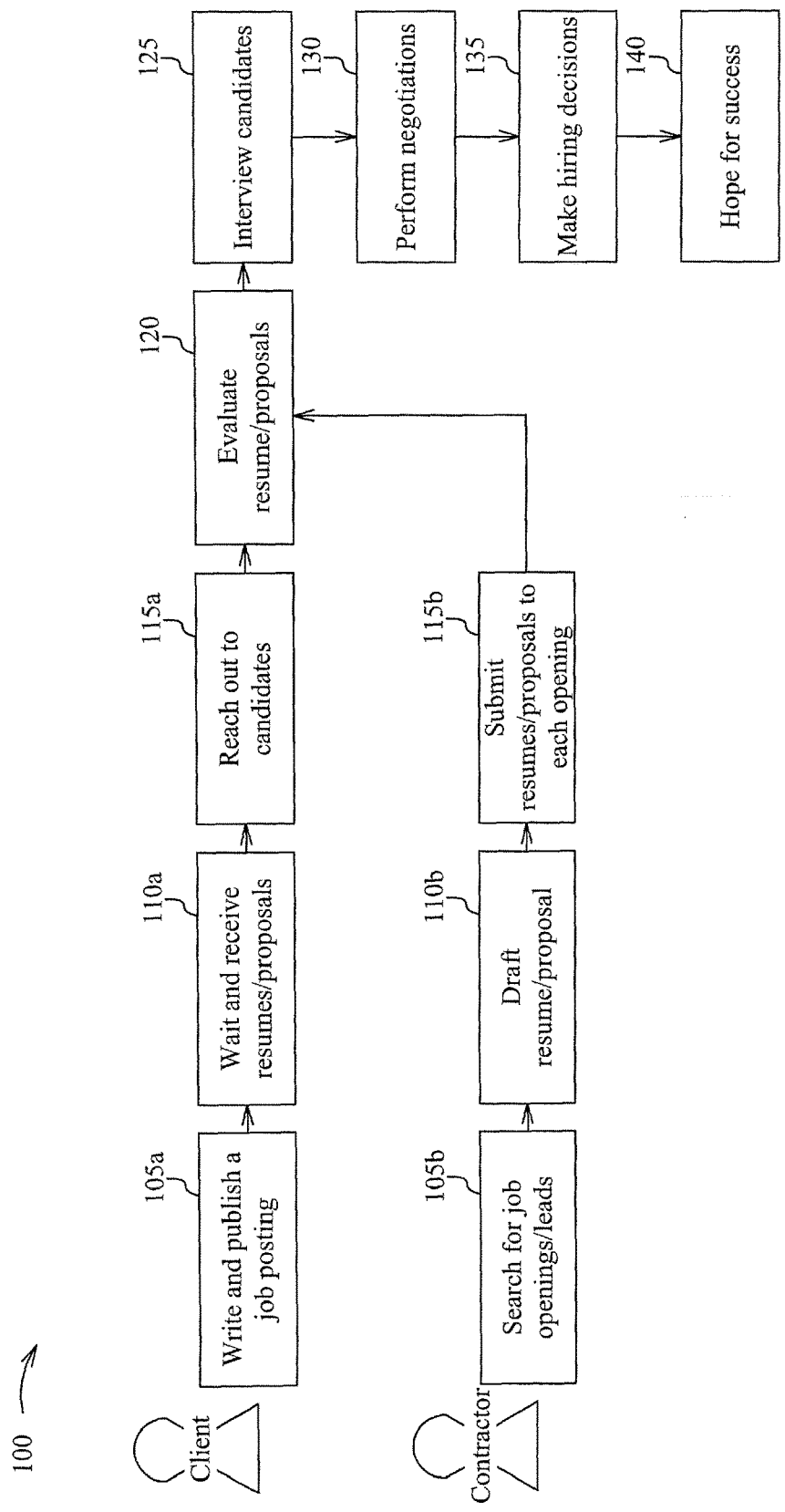
FIG. 1 illustrates a traditional hiring process.

The present invention potentially eliminates most of the steps required in a traditional hiring process, such as that illustrated in FIG. 1. For example, there is no longer a need for a client to write and publish a job posting (step 105a), wait and receive resumes/proposals (step 110b), and/or reach out to one or more candidates and invite them to submit proposals/resumes if needed (step 115b) since the present invention advantageously presents the best candidates to the client based on at least the client's requirements. Instead, in some embodiments, the client only needs to provide a short description about the opening. The client is then served with ideal candidates for the opening. The client is able to evaluate the candidates and, optionally, view their profiles. The client is able to make a hiring decision on the spot.

For another example, there is no longer a need for a contractor to do a search through job postings or business leads (step 105b), and/or submit a resume or proposal to each opening (step 115b) since the present invention advantageously presents the best business leads or available jobs to the contractor based on at least the contractor's requirements. Instead, in some embodiments, the contractor only needs to create or update his or her online profile, and indicate his or her availability and skill sets via the online profile. The contractor is able to wait for business leads to come to him or her.

Figure 2:
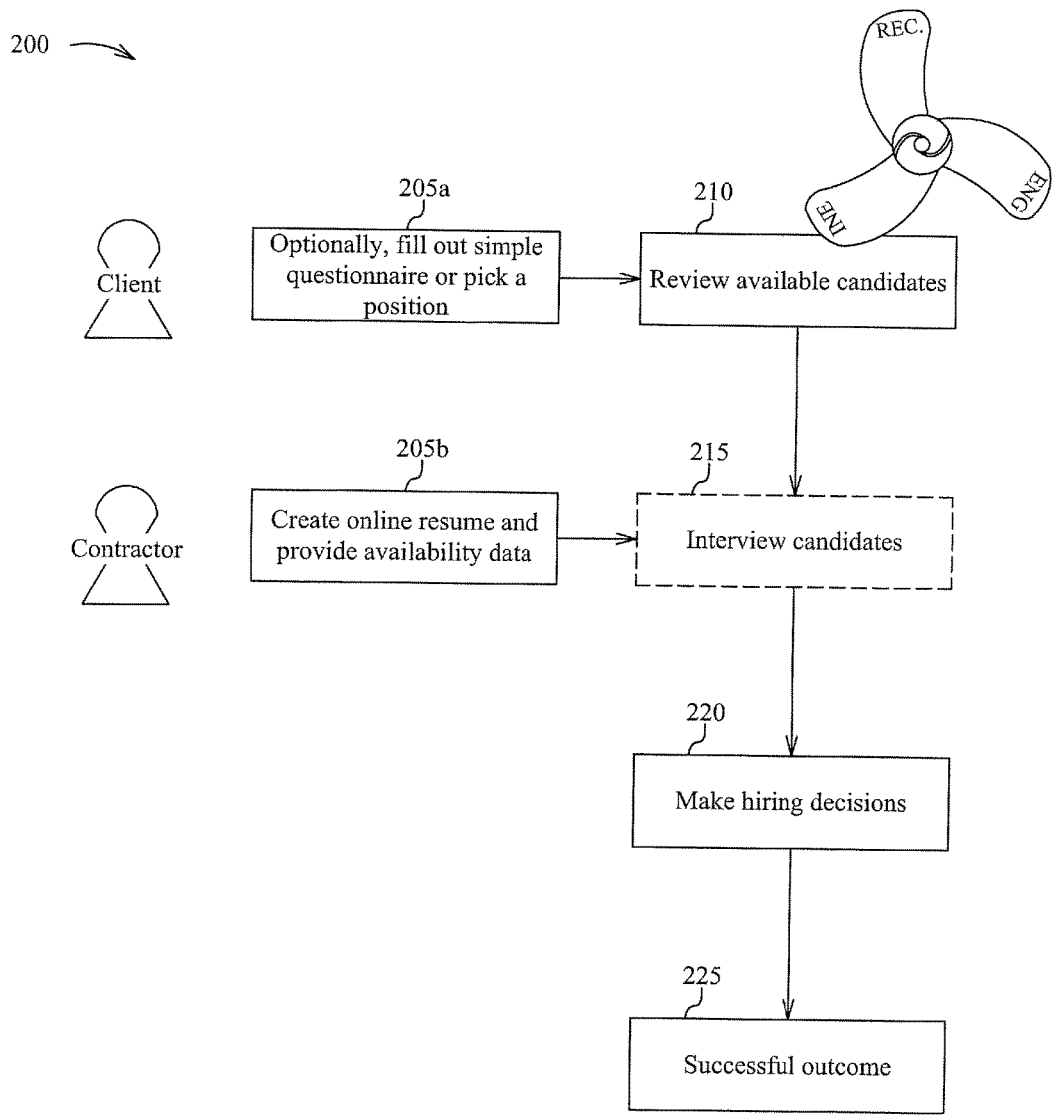
FIG. 2 illustrates an exemplary hiring process in accordance with the present invention.

FIG. 2 illustrates an exemplary hiring process 200 in accordance with the present invention. At an optional step 205a, a client is able to fill out a simple questionnaire regarding preferences (e.g., location, time zone, language, etc.) and/or is able to simply provide a position. For example, instead of writing an extensive, detailed description of the position, the client is able to simply specify "PHP developer."

At a step 205b, a contractor is able to complete an online resume or profile and provide availability information.

A recommendation engine, implementing a machine learning algorithm, then presents one or more candidates (e.g., 3 contractors) that it has determined to be the best or top matches. For example, the recommendation engine intelligently serves Abigail, Finn and Kristin as the top candidates, because the recommendation engine has determined that choosing any of them will result in a successful outcome. In some embodiments, the recommendation engine considers the client's hiring requirements and each contractor's employment requirements when making the determination. Details of the recommendation engine are discussed below.

At step 210, the client evaluates the presented candidates, such as by reviewing their profiles to see, for example, their job histories, job certificates, licenses, what time zones they are in, etc.

At an optional step 215, the client is able to interview any one of the served candidates, such as by using a communication mechanism located in their profiles. In some embodiments, a profile is configured to indicate whether a contractor is presently online. In some embodiments, a profile includes at least one communication mechanism configured to allow a direct live communication between the client and the associated contractor directly from the profile. An exemplary live communication is a telephone call, instant messaging, or video chatting. Other live communication methods are contemplated. The at least one communication mechanism allows the client to interview the contractor to thereby make a more informed hiring decision. In some embodiments, a contractor's rate is non-negotiable since it is already made known to the client. Regardless, the client is able to feel confident that choosing one from the served candidates to work with will more likely than not result in a success.

At a step 220, the client makes hiring decisions. The client is able to explicitly select or reject candidates.

At a step 225, both the client and the contractor know that the outcome will be a success (e.g., happy with each other, would want to work with each other on the present project and other projects), because the recommendation engine takes into consideration at least the client's requirements and each contractor's requirements to determine one or more matches. The determination is thus not made using one or single sided requirements.

Continuing with the example, when Aaden enters the services marketplace, he is able to indicate that he is looking to hire a PHP developer who is available today. Abigail, Finn, Kristin, Ethan and Aria all have indicated that they are familiar with PHP. All, except for Ethan, have indicated that they are currently available to start work immediately. The recommendation engine determines and presents the top 3 best matched candidates—Abigail, Kristin and Finn—to Aaden. Top matched candidates are preferably those who are available, who can do the job and who has the track record of doing the job. As such, the recommendation engine does not present Ethan as a candidate since he is currently unavailable for work. Likewise, the recommendation engine does not present Aria as a candidate since the recommendation engine has determined that Aria has only worked for and will probably work only for corporations and not for individuals. Aaden is able to thereafter correspond with any of the candidates and is able to explicitly hire Abigail on the spot because, after interviewing or talking with Abigail, she is the one whom Aaden feels the most comfortable with. Although not necessary, Aaden is able to explicitly reject Kristin, Finn or both when making a decision.

The present invention advantageously transforms the hiring process from a stop and go series of actions to a streamlined, a shopping-like exercise. The recommendation engine, as it will become apparent, significantly increases the chance of a successful outcome of a match because not only does the recommendation engine take into consideration Aaden's requirements in a hire but the recommendation engine also takes into consideration each contractor's requirements in an employment.

Recommendation Engine

Figures 3, 4:
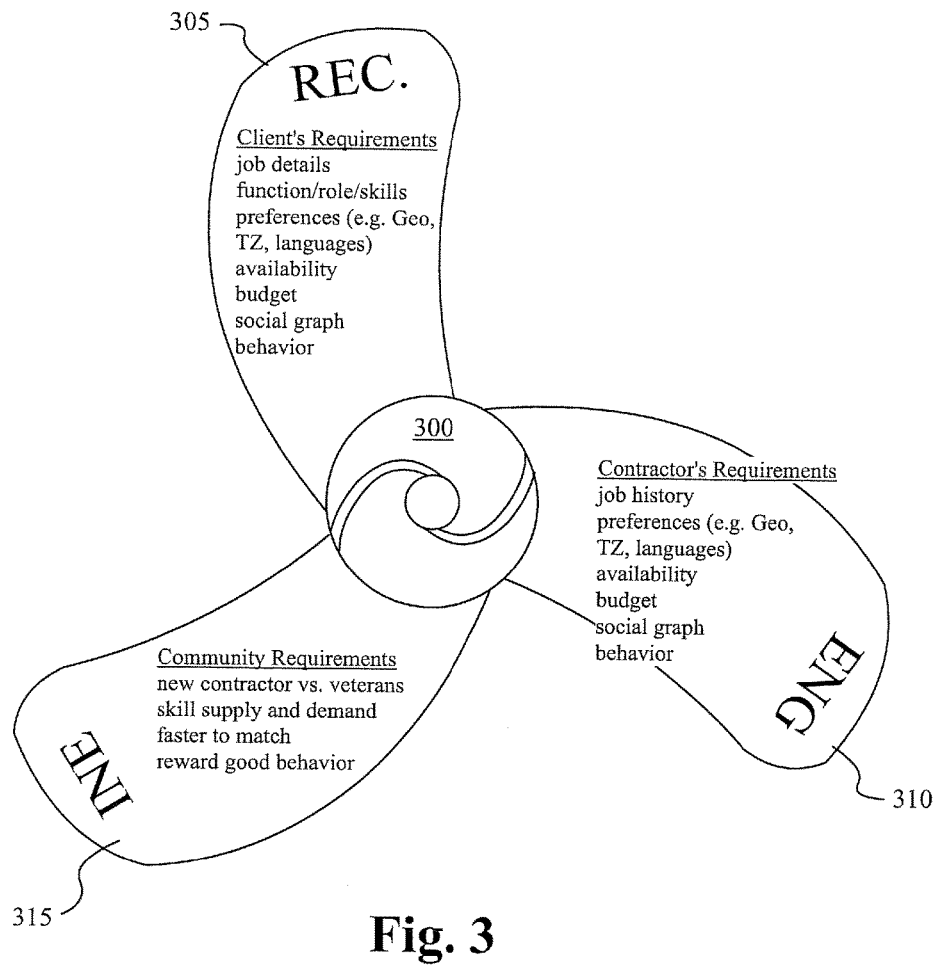
FIG. 3 illustrates an exemplary recommendation engine in accordance with the present invention.
FIG. 4 illustrates an exemplary diagram of the taxonomy of online work in accordance with the present invention.

FIG. 3 illustrates an exemplary recommendation engine 300 in accordance with the present invention. In some embodiments, the recommendation engine 300 is machine learning powered that understands a client's requirements 305, contractors' requirements 310, and community requirements 315.

The client's requirements 305 include job details, function/role/skills, geography, time zone, languages, availability, budget, social graph, and/or behavior. Other client requirements are contemplated. More or less client requirements can be considered by the recommendation engine 300. A simple questionnaire can be used to determine the type or details of job that the client is looking to be filled. The client can simply indicate that the client is looking for a graphic designer or can provide additional information, such as a logo with specific attributes (e.g., interlocking hearts representing mother and child). The client can also specify the function/role/skills of the job and preferences such as geography, time zone, languages. The client can also specify a budget range associated with the job opening. The client can also specify social networks the client is a part of to allow the recommendation engine to access social graphs in these social networks. The recommendation engine is able to take into consideration who the client's connections have hired before since it is likely that one has a more successful outcome of hiring someone that a connection has used before. The recommendation engine is also able to gather and use the client's behavior data in the services marketplace. For example, the recommendation engine could determine that Aaden in the services marketplace subconsciously hires people only from India, or hires people only in the $20-$30/hour range, even though Aaden does not explicitly state these preferences.

A contractor's requirements include job history, function/role/skills, geography, time zone, languages, availability, budget, social graph, and/or behavior. Other contractor requirements are contemplated. More or less contractor requirements can be considered by the recommendation engine 300. The contractor's job history, both within the services marketplace and offline, is based on the contractor's online profile completed by the contractor. The contractor can also specify the function/role/skills the contractor can fill or has, and preferences such as geography, time zone, languages. The contractor can also specify a budget range the contractor desires. The contractor can also specify social networks the contractor is a part of to allow the recommendation engine to access social graphs in these social networks. The recommendation engine is able to take into consideration who the contractor's connections have worked for before since it is likely that one has a more successful outcome of working for someone that a connection has worked for before. The recommendation engine is also able to gather and use the contractor's behavior data in the services marketplace. For example, the recommendation engine could determine that Abigail in the services marketplace subconsciously works for people only from India, or works only for individuals rather than big corporations, even though Abigail does not explicitly state these preferences.

The recommendation engine ensures that every aspect of data regarding a user (e.g., client, contractor) is factored in, not just structured data explicitly provided by the user but also unstructured data (e.g., behavior data) implicitly provided by the user. Unstructured data are those that are not or cannot be explicitly stated but can be learned from past behavior on the services marketplace. For example, there are two types of contractors within the services marketplace: one who does freelancing and another that is an established business. A client can have a strong preference for one over another without explicitly stating such. The recommendation engine is able to determine such preference and will only serve candidates who are individuals in future matches to the client.

For another example, even though a client had previously explicitly indicated that they prefer contractors who have at least a 3 star rating but ultimately have always chosen in the past ones that have a 5 star rating, the recommendation engine is able to determine such preference and will only present or serve candidates with a 5 star rating in future matches to the client.

For yet another example, the recommendation engine is able to determine that a client does not like to hire a contractor who have only held consulting jobs in the past or have only been involved on tertiary work (e.g., nothing core or strategic to company). The client does not indicate this in any structured manner. However, every time a contractor includes consulting positions or indicates tertiary work in his or her profile, the client does not end up hiring that contractor. The recommendation engine is able to determine such preference and will only serve candidates who have worked on core projects and have held full time jobs in future matches to the client.

For yet another example, the recommendation engine is able to determine that a contractor has consistently declined invitations to work on Christmas themed projects. The contractor has not indicated this in any structured manner. However, every time the "Christmas" word appears in the job title, the contractor declines the invitation. The recommendation engine is able to determine such preference and will not present future job leads involving Christmas to the contractor.

For yet another example, the recommendation engine is able to determine that a contractor has consistently declined invitations to work on projects for Forma, a company that the contractor for one reason or another refuses to work for. The contractor has not indicated this in any structures manner. However, every time the invitation from Forma is sent to the contractor, the contractor declines the invitation. The recommendation engine is able to determine such preference and will not present future Forma job leads to the contractor.

As discussed, the recommendation engine considers every single aspect or activity in serving an intelligent match. An activity can be as subtle as clicking on one profile over another profile for viewing. For example, Aaden's viewing of Finn's online profile is an indicator to the recommendation engine that there is something about Finn that is of interest to Aaden and to factor that into the machine learning algorithm.

In some embodiments, an action can be considered as a positive action or as a negative action. For example, Aaden's clicking on Finn's profile can be considered a positive action. For another example, Aaden explicitly rejecting Finn and Kristin as candidates can be considered negative actions. With a positive or a negative action, there is a high percentage of certainty that this is what Aaden wanted to do. Therefore, in some embodiments, activities within the services marketplace are given weights. For example, an action that is associated with a higher percentage of certainty can be given more weight than an action that is associated with a lower percentage of certainty. For another example, an action that is considered more meaningful can be given more weight than an action that is considered less meaningful. In some embodiments, the weights are tunable. Fundamentally, all actions are tracked, recorded and associated with weights, and are factored into the machine learning algorithm.

As a member (e.g., client, contractor) transacts more and more on the services marketplace, the recommendation engine will continually learn therefrom and improve the matches provided to the member based on the behavior data collected on that member. However, in some instances, the recommendation engine will not have any behavior data to collect and/or learn from because a member is new and has no activity on the services marketplace (aside from perhaps creating a job detail or a profile). In such an instance, the recommendation engine typically factors in only the new member's job detail or online profile for the new member's requirements during a matching process. However, the recommendation engine will begin to collect and learn from the new member's behavior data.

In FIG. 3, the community's requirements 315 are based on what would best benefit the services marketplace as a whole. Considerations include new contractors versus veterans. A new contractor has no record in the services marketplace and thus can have a harder time getting hired. The recommendation engine is able to serve new contractors during a match without sacrificing the likelihood of success. The considerations also include improving the supply and demand of skills within the services marketplace, faster matching and rewarding good behavior. Other community requirements are contemplated. More or less community requirements can be taken into consideration by the recommendation engine 300.

The recommendation engine 300 looks at all these requirements 305, 310, 315 to determine and present a client with a strong selection of highly relevant candidate(s) for the client to make a hire.

FIG. 4 illustrates an exemplary diagram of the taxonomy of online work in accordance with the present invention. The taxonomy of online work helps the recommendation engine understand services. A client, who has a vacant job to fill, typically first looks at function and asks "What function am I looking for?" For example, the function can be engineering, product, sales, marketing, etc. A layer deeper is the title or role of the job. For example, the title or role can be web developer, mobile developer or QA engineer. For each of the roles, there are associated skills. For example, a web developer is someone who can code PHP, HTML, JavaScript or CSS 3.0. If a client is savvy and understands the details of a job opening, then the client is able to provide the required skills. However, a client is typically only able to superficially describe a job opening and perhaps provide a role but nothing more specific than that.

A contractor approaches a job hunt from the opposite direction. The contractor typically knows skills he or she possesses, is able to determine the kinds of roles he or she can lead, and perhaps is able to explore the different functions he or she can serve. However, often times, a contractor does not know that he or she can serve in functions other those that the contractor has previously served in.

In some embodiments, the recommendation engine uses this taxonomy, which is an essential piece of tying clients and contractors together within the services marketplace. For example, if Aaden is looking for a web developer opening to be filled, the recommendation engine will match Aaden with those who have the skills required. Aaden does not need to know the specific skills (e.g., PHP, HTML, JavaSript, CSS) required for the opening. The recommendation engine advantageously determines those skills for Aaden to find candidates.

The present invention supports role or positioned based jobs and deliverable based jobs. A role or position based job is typically an ongoing service. If a client wants to build a team, the contract typically looks for someone who is looking to fill a role or position based job. However, if the client has a deliverable that needs completed, the client typically looks for someone who is looking to fill a deliverable.

Figure 5:
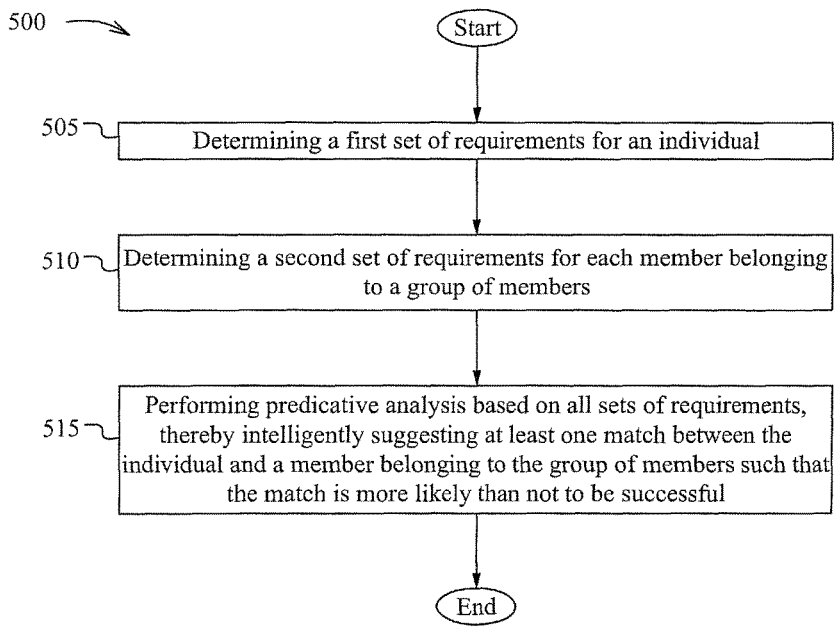
FIG. 5 illustrates an exemplary matching method in accordance with the present invention.

FIG. 5 illustrates an exemplary matching method 500 in accordance with the present invention. The method 500 begins at a step 505, where the recommendation engine determines a first set of requirements for an individual, such as a client like Aaden. The client's requirements are discussed with respect to FIG. 3.

At a step 510, the recommendation engine determines a second set of requirements for each member belonging to a group of members. The group of members can include contractors, like Abigail, Finn, Kristin, Aria and Ethan, within the services marketplace. A contractor's requirements are also discussed with respect to FIG. 3.

Figure 6:
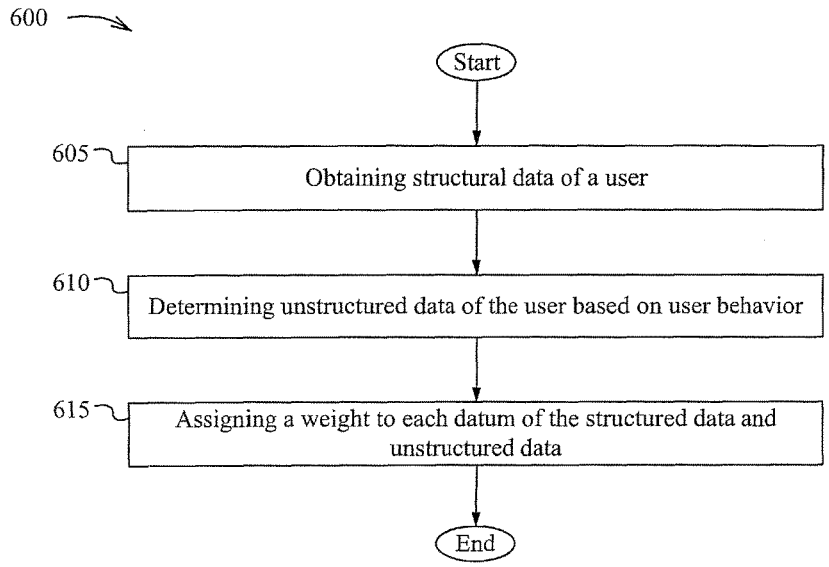
FIG. 6 illustrates an exemplary method of obtaining requirements of a user in accordance with the present invention.

Each set of requirements can include at least one structured datum, at least one unstructured datum or a combination thereof. Structured datum is typically explicit and unstructured datum is typically implicit. FIG. 6 illustrates an exemplary method 600 of obtaining requirements of a user in accordance with the present invention. The user can be a client or a contractor. The method 600 begins at a step 605, where structured data of the user is obtained. For example, structured datum can be job details (for a client), job history (for a contractor), function/role/skills, geography, time zone, languages, availability, budget, or any other expressed datum.

At a step 610, unstructured data of the user based on past behavior of the user in the community is determined. For example, unstructured datum can be a positive user action, a negative user action, or any other behavior datum.

At a step 615, a weight is assigned to each datum of the structured data and unstructured data. Typically, a datum, such as an action, that is considered more meaningful can be given more weight than a datum that is considered less meaningful. After the step 615, the method 600 ends.

Each set of requirements can also include one or more social graphs associated with one or more social networks. As discussed above, the recommendation engine can take into consideration the connections of each of the client and contractors. Typically, the client and the contractors are able to give the services marketplace the login information to these social networks. In some embodiments, the connections are also weighted.

Referring back to FIG. 5, at a step 515, the recommendation engine performs predictive analysis based on all sets of requirements, thereby intelligently suggesting at least one match between the client and a contractor such that the match is more likely than not to be successful. In some embodiments, the predictive analysis is based on a machine learning algorithm, which is configured to learn from past user behavior. In some embodiments, the recommendation engine tracks the actions of each user participating in the community. Continuing with the example, the recommendation engine serves Abigail, Finn and Kristin among all contractors as candidates. Ethan is not served as a candidate because he has indicated that he is currently unavailable for work. Aria, even though she is available for work, she has consistently declined in the past to work for individuals. The recommendation engine, aware of all these aspects, will not serve Ethan and Aria as candidates. After the step 515, the method 500 ends.

In some embodiments, the recommendation engine not only uses the client's requirements and the contractors' requirements, the recommendation engine also uses requirements of a community (e.g., services marketplace) in making the suggestion. As discussed above, the requirements of the community typically are those that best benefit the community as a whole. For example, the recommendation engine has served Finn as a candidate, even though there is no behavior data on Finn, to help Finn find a job in the services marketplace, without compromising the likelihood of success of a match.

Although the scenarios above illustrate matching contractors with a client's job opening, it should be understood that the recommendation engine not only is able to provide a client with best matched contractors, the recommendation engine is also able to provide a contractor with best matched job leads. Furthermore, the present invention has been described relative to matches in a services marketplace. However, the present invention can be applied to other types of matches.

Exemplary Architecture

Figure 11:
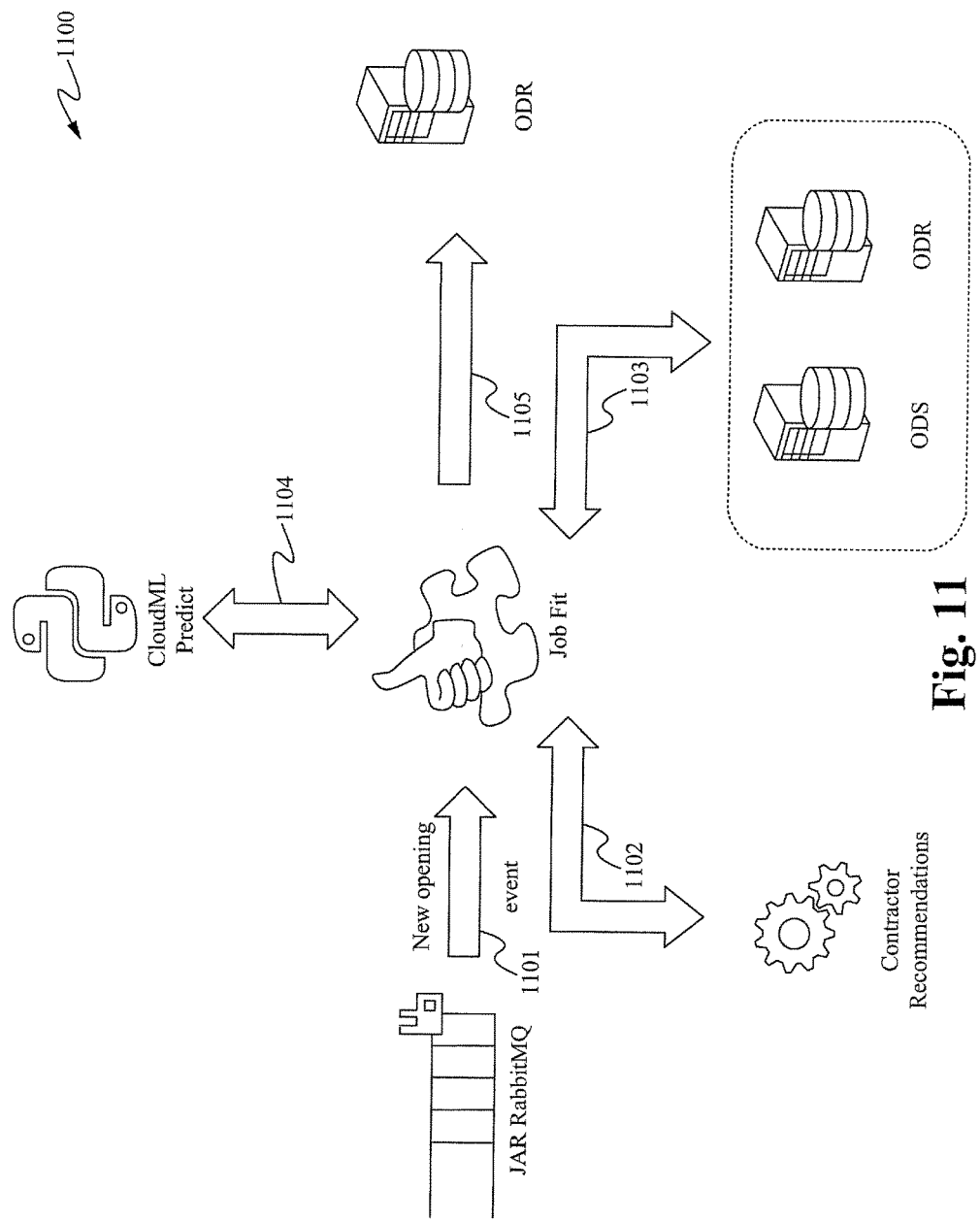
FIG. 11 illustrates an exemplary architecture in accordance with the present invention.

FIG. 11 illustrates an exemplary architecture 1100 in accordance with the present invention. In some embodiments, the recommendation engine is implemented using the architecture 1100. Modules of the architecture 1100 can reside on one or more computing devices, such as the computing device 700 of FIG. 7.

At a step 1101, a Job Fit server that runs on Apache Tomcat™ listens to the JAR's RabbitMQ™ for new job openings. RabbitMQ™ is an open source message passing system. RabbitMQ™ is used to pass events, such as a new opening, a new application (discussed below), etc., that was created or updated. In some embodiments, each of the new job openings corresponds to a new position created upon completion of the step 205a of FIG. 2. Generally, end user inputs in generating new positions trigger actions that make calls to remote procedures that pass these events to RabbitMQ™.

At a step 1102, using a contractor recommendation service, Job Fit retrieves the top N suggested contractors for a new opening. The contractor recommendation service runs on top of a freelancer search infrastructure. The contractor recommendation service extracts keywords from the job opening and uses the extracted keywords to submit a query to a freelancer search engine. An exemplary freelancer search engine is discussed in U.S. Pat. No. 8,380,709, entitled "METHOD AND SYSTEM FOR RANKING USERS" and issued on Feb. 19, 2013, which is hereby incorporated by reference in its entirety. Another exemplary freelancer search engine is discussed in U.S. patent application Ser. No. 12/476,039, entitled "BUYER-PROVIDER MATCHING ALGORITHM" and filed on Jun. 1, 2009, which is hereby incorporated by reference in its entirety. Yet another exemplary freelancer search engine is discussed in U.S. Pat. No. 8,700,614, entitled "METHOD OF AND A SYSTEM FOR RANKING MEMBERS WITHIN A SERVICES EXCHANGE MEDIUM" and issued on Apr. 15, 2014, which is hereby incorporated by reference in its entirety.

Contractors are ranked using CloudML, which is a machine learning platform developed the inventors of the instant invention. In some embodiments, the CloudML uses models and input data to predict a class of an entity. A model is trained using one or more machine learning methodologies and is based on past data. Input data describing the entity are called features. Each feature is assigned a different weight during model training. In some embodiments, models are trained off a production infrastructure, and trained models are then deployed on the production infrastructure to run predictions. CloudML Predict keeps at least one model in memory as a list of coefficients. CloudML Predict accepts new inputs via a RESTful API, applies the coefficients and returns predictions. In particular, CloudML Predict exposes the RESTful API such that other systems are able to pass features to any available model. CloudML then applies the model's feature weights to the input data and, in the response, returns a list of possible classes as well as the probability that the entity described by the input data belongs to each class. The response is able to contain information about the role of each feature in the decision.

For example, consider that a contractor is described by his hourly rate and the feedback from other users (e.g., a score from 0 to 5) in the services exchange medium. Based on this information, a model is able to decide whether the contractor is too expensive for a job or not. This model includes two features: the hourly rate and feedback. The trained model will know the weight of each feature. CloudML Predict is able to load this model and listen for HTTP connections through its RESTful interface. Other services/applications can send the contractor's profile to CloudML Predict and can use the response for their logic. The response will contain a list of the two classes (e.g., expensive and inexpensive), and the probability of each class. As an example, if CloudML Predict calculates that the contractor is 75% likely to be expensive, CloudML Predict will return something similar to [(expensive: 0.75), (not-expensive: 0.25)].

At a step 1103, in order to rank the suggested contractors, Job Fit loads a plurality of profiles from ODS (oDesk Data Service) and ODR (oDesk Data Repository) services. The plurality of profiles include an opening profile, an employer profile and contractor profiles. In some embodiments, the opening profile is associated with the new job opening. In some embodiments, the employer profile is associated with the client who created the new job opening. In some embodiments, each of the contractor profiles is associated with one of the suggested contractors.

ODR is a RESTful service that accepts an input a free-lancer or an opening or client identifier and returns information about the input entity. In some embodiments, the information is collected from various data source and is materialized in a document. ODS is a caching layer on top of production database tables.

At a step 1104, two calls to CloudML are made using two different models, namely a rank model and an autohide model, to calculate scores and annotations.

At a step 1105, the scores from the step 1104 are sent to ODR for storage and, based on the scores, top K from the top N are selected as potential Job Fit (e.g., best matched candidates) to be presented to the client.

Advantages

The recommendation engine of the present invention is configured to advantageously perform predictive analysis to intellectually pair an individual with at least one selected member of the services marketplace such that the pairing is based at least on behavior characteristics of the individual and the at least one selected member. The behavior characteristics are typically determined by the machine learning algorithm implemented by the recommendation engine. The recommendation engine is also configured to determine a first success rate of an outcome of a match between the individual and a first member, to determine a second success rate of an outcome of a match between the individual and a second member, and to advantageously present one of the two matches with the higher success rate. In some embodiments, success is defined by a hire and an eventual positive feedback after completion of the job.

Proposal Recommendations

Overview

Although the online community provides the recommendation engine as part of its service to its members, a client is not required to use the recommendation engine in selecting a candidate to complete a job. The client can rather choose to personally review job proposals received in response to a job post previously submitted by the client. However, reviewing each and every proposals can be a daunting task, especially if the client is under a time constraint and/or has received an overwhelming number of proposals for the one job post. It can be difficult for the client to distinguish good proposals from bad proposals.

Some embodiments of the present invention are directed to a system and method of calculating a match score for each interested contractor and mapping the match score to a level to assist a client in distinguishing those proposals that may potentially be worthwhile to review from the other received proposals. An interested contractor is one who had previously submitted a proposal to the client's job post. Interested contractors in a list are ranked based on a rank score that is calculated for each of the interested contractor using a set of factors. The rank score for an interested contractor is a mathematical combination of factor scores associated with the factors. A mapping engine, implementing a machine learning model, maps each of the interested contractors to one of at least two levels based on the set of factor scores associated with that contractor, by comparing the set of factor scores to historical data collected by the system to determine the likelihood of the contractor having that set of factor scores being chosen by the client. Any of the interested contractors who have been mapped to, at least, the highest level is visually distinguished from the others in the list. The mapping engine is configured to continuously learn from the historical data to improve future mappings.

It should be understood that discussion regarding ordering, classification or mapping, and selecting/choosing a contractor also refers to ordering, classification or mapping, and selecting/choosing the contractor's proposal, as each contractor is associated with a proposal.

Hypothetically, assume that Orion is a member, specifically a client, of the online community. In response to a job post, Orion receives 100 proposals from different contractors. Orion is under pressure to fill the position within two days and is intimidated by the number of proposals he has received. In some embodiments, within the listing of interested contractors (or the proposals as they are associated with the interested contractors), the better proposals are tagged with a "Good Match" icon or a "Strong Match" icon, as there may be different degrees of mapping to help Orion distinguish the better proposals from the other proposals. The present invention potentially eliminates the need to review each and every proposal and saves time when the client reviews only those indicated or distinguished by the mapping engine.

Figure 8:
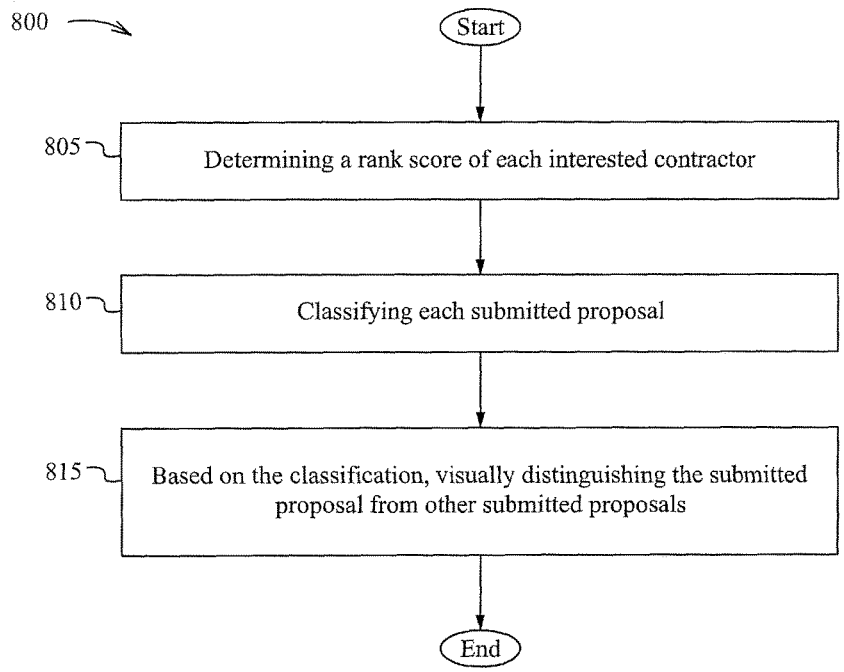
FIG. 8 illustrates an exemplary sorting and identification process in accordance with the present invention.

FIG. 8 illustrates an exemplary sorting and identification process 800 in accordance with the present invention. The process 800 begins at a step 805. At the step 805, a rank score of each interested contractor is determined. The rank score is used to present all the interested contractors in an ordered manner to the client, Orion. In the hypothetical, a rank score of each of the 100 different contractors is determined. The 100 different contractors are then ranked or sorted using the rank score, typically, with the highest rank score at the top of the list. However, the list can be sorted differently using one or more sorting schemes. For example, using rank score and date/time stamp, if two interested contractors have the same rank score, the one who submitted a proposal is typically listed before the other.

In some embodiments, the rank score is calculated from a plurality of factor scores associated with a plurality of factors. Examples of the factors include feedback, rate, location, skills and award ratio, which are attributes that can be determined by a contractor's participation in the online community. More or less factors are possible. In some embodiments, a user, such as the client, specifies which factors are important to the user. The client is able to select any number of factors to be used in the determination. Alternatively, the factors are automatically selected based on learned behavior of the client. Only the factors that the system has determined as important to the client are used. For example, the factors automatically selected for Orion could be feedback and location.

Each factor has a factor score based, in part, on a factor weight and a personal factor value. Each factor is associated with a criteria calculation that is the same for each member. This criteria calculation determines a member's personal factor value for a factor. It is noted that criteria calculation can differ between factors, although criteria calculation for a factor is the same for all members.

A contractor's personal factor value of a factor can vary depending when that personal factor value is calculated, since the contractor's contribution to the online community typically changes over time. For example, the contractor's personal factor value for feedback can go up or down after each project is completed. For another example, the contractor can increase his/her rate, thereby changing the contractor's personal factor value for rate. This is also true for other members, including clients, of the online community.

The personal factor value is combined with the factor weight. In some embodiments, some or all of the factor weights are manually tuned by a user, such as the client, or are automatically tuned based on machine-learned importance through the user's behavior. Alternatively, all of the weights are static and are determined by system operators. The weight value can be the same for all factors. Alternatively, the weight value can be different for each factor such that a weight for a first factor is different from a weight for a second factor. For example, if Orion deems the location factor to be more important than the feedback factor, then the weight for the location factor is larger than the weight of the feedback factor.

The optional customization of factors and their weights advantageously allows a client to specify what is pertinent or important and what is not pertinent or important to the client. Factors and weights can varying from job post to job post submitted by the same client. Similarly, factors and weights can varying from client to client.

In some embodiments, the factor score is a normalized score, ranging between 0 and 1. It is contemplated that other ranges are possible. The factor scores are typically not compared with each other. Rather, all of the factor scores are combined. The rank score is a mathematical combination of all the factor scores. Put differently, the rank score is a weighted sum of factor scores.

At a step 810, a mapping engine classifies each submitted proposal as one of at least two levels by accessing historical data collected by the online community. The at least two levels typically include a first recognition level and no-recognition level. In some embodiments, the at least two levels further include a second recognition level. The first recognition level could be a "best match" level, and the second recognition level could be a "good match" level. Those proposals that do not fall in either the "good match" level or the "best match" level are classified in the no-recognition level. Additional recognition levels are possible. In fact, in some embodiments, the client is able to specify the number of recognitions levels and its associated thresholds.

In some embodiments, each submitted proposal is classified as one of at least two levels by determining a percentage of likelihood of the submitted proposal being selected. This determination is based on the set of the individual factor scores associated with the plurality of factors for that contractor. The percentage of likelihood of the submitted proposal being selected is determined using the historical data collected by the online community. In particular, the mapping engine looks at the set of factors and the associated set of factor scores and determines, based on this particular set of factor scores (e.g., 0.5 for location and 0.8 for feedback), what the probability of being awarded is for having that particular set of factor scores. In other words, if the historical data show that members who have a similar set of information are always awarded in the past, then the percentage of the contractor in this instant being awarded will also probably be high.

At a step 815, based on the classification in the step 810, the submitted proposal is visually distinguished from other submitted proposals. If the mapping engine uses three recognition levels, then a submitted proposal is visually distinguished in a first manner upon the determination that the percentage of likelihood is above a first threshold, is visually distinguished in a second manner upon the determination that the percentage of likelihood is above a second threshold, or otherwise is not visually distinguished. For example, a first threshold could be 95% and the second threshold could be 90%. If the percentage of likelihood of Dante's submitted proposal being submitted is determined to be 96%, then Dante's submitted proposal is visually distinguished with a "best match" icon. If the percentage of likelihood of Ayan's submitted proposal being submitted is determined to be 94%, then Ayan's submitted proposal is visually distinguished with a "good match" icon. If the percentage of likelihood of Natalie's submitted proposal being submitted is determined to be less than 90%, then Natalie's submitted proposal is not visually distinguished with either a "best match" icon or a "good match" icon. Although icons are used to distinguish proposals, it is contemplated that other ways to distinguish proposals are possible. After the step 815, the method 800 ends.

In some embodiments, the number of submitted proposals visually distinguished is limited by a number, either set by the client or by system operators, so as to not overwhelm the client. Alternatively, the number of submitted proposals visually distinguished is not limited.

Figure 9:
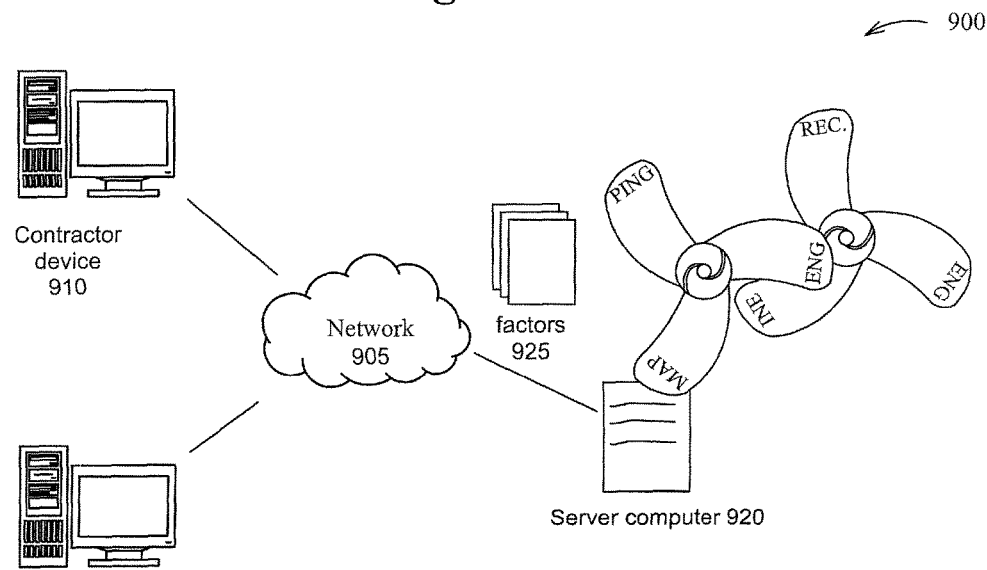
FIG. 9 illustrates an exemplary system in accordance with the present invention.

FIG. 9 illustrates an exemplary system 900 in accordance with the present invention. The system 900 includes a network 905, a server computer 920, a contractor device 910 and a client device 915. The server computer 920, the contractor device 910 and the client device 915 can implement the same or similar structure as that illustrated in FIG. 7.

The contractor device 910 is typically used by a contractor and the client device 915 is typically used by a client to access the service provided by the client computer 920. Both the contractor and the client are members of the online community. Although only one server computer 920 is shown, the service can be provided via a plurality of server computers 920. The server computer 920 typically includes applications and/or hardware for implementing the recommendation engine and the mapping engine. Further, although a single client and a single contractor is illustrated in FIG. 9 for clarity and simplicity, the online community can include more than one client and more than one contractor. In some embodiments, a member can be a client and a contractor working for another client.

From the client device 915, the client submits a job post to the online community such that all of its members can view the job post. The system 900 also includes a set of factors 925 pertinent to the client. As discussed elsewhere, the client is able to customize of types of factors and their weights for that particular job. Interested contractors who have submitted proposals for the job post are ranked using that set of factors.

The server computer 920 is configured to present results related to the job post. The results include an ordered listing of interested contractors that is determined by a rank score associated with each of the interested contractor. The rank score is determined by calculated scores for those factors pertinent to the client. In particular, the rank score is a combination of the factor scores that are associated with the factors.

The mapping engine is configured to access past data of all members to map each of the interested contractors to one of at least two levels based on the set of factor scores associated with that contractor. The mapping engine implements a machine learning model to continuously learn from historical data collected by the system to improve future mappings.

FIG. 10 illustrates an exemplary web page 1000 presented to a client in accordance with the present invention. Typically, the web page 1000 includes information 1010 regarding the total number of proposals received in response to a job post. In FIG. 10, the web page 1000 shows that 56 proposals were received in response to the job post titled "Website for Danny's Donuts." The web page 1000 displays an ordered list of all interested contractors 1015, although FIG. 10 shows only the top 4 ranked contractors 1015a-1015d. The contractors 1015 are typically sorted or ordered by a rank score, which is a numerical value calculated for each contractor based on a set of factors. The set of factors are associated with factor scores. The rank score is a mathematical combination of the factor scores. Although not shown in FIG. 10, the rank score for each contractor can be displayed in the web page 1000. If two contractors have the same rank score, then the two contractors are ordered based on proposal submission date/time stamp or by mapped level. In FIG. 10, the contractor "Dominoes" 1015a is ranked at the top, followed by the contractor "Mighty Site Builder" 1015b, the contractor "Cinderelly Creations" 1015c, and then by "Sugar Cubes" 1015d. The fifth ranked contractor through the lastly ranked contractor are not illustrated in FIG. 10.

Each contractor 1015 listed includes a user name 1020, a link or icon 1025 to the contractor's proposal, date/time stamp of the proposal submission 1030, a brief introduction or summary of the contractor 1020, statistical information about the contractor 1040 and one or more contact buttons 1045 enabling quick and/or direct contact with the contractor without needing to leave or exit the web page 1000.

In some embodiments, statistical information about the contractor 1040 can be pulled from the contractor's profile. In some embodiments, statistical information are provided by the contractor (e.g., rate). In some embodiments, statistical information are calculated by the system (e.g., earnings).

In some embodiments, the one or more contact buttons 1045 enable means to call the contractor directly from the web page 1000, chat with the contractor directly from the web page 1000, or compose an email to sent to the contractor. Other means to call the contractor are possible.

Assume that the mapping engine uses three recognition levels. The first recognition level is "best match" and is associated with 90% threshold (e.g., 90% chance or better of being selected). The second recognition level is "good match" and is associated with 80% threshold (e.g., 80% chance or better of being selected). The third recognition level is the no-recognition level, meaning that the contractors (or the proposals) that do not meet any of the thresholds are mapped to the no-recognition level. In FIG. 10, the contractor "Dominoes" and the contractor "Sugar Cubes" are both visually distinguished from the other contractors by the "Best Match" icon 1050, and the contractor "Cinderelly Creations" is also visually distinguished from the other contractors by the "Good Match" icon 1055. The "Best Match" icon and the "Good Match" icon both indicate to the client that it would be worthwhile to review the proposals with these icons because the client is likely to find these contractors to be a better fit to complete the job. Sometimes the difference in the quality of work between a contractor in one level and a contractor in a level lower is insignificant. Sometimes the difference in the quality of work between a contractor that is distinguished and a contractor that is not distinguished can be significant. Accordingly, the mapping engine's characterization of contractors by using different levels allows the client to wisely select the proposals to review while intelligently distinguishing the better proposals from the others.

In some embodiments, when either the "Best Match" icon 1050 or the "Good Match" icon 1055 is activated, a list of criteria and associated values are displayed for the respective contractor. For example, in FIG. 10, when the "Good Match" icon 1055 is activated, the list of criteria 1060 is displayed. The list of criteria 1060 may or may not include all of the factors used to determine Cinderelly Creations' level. Similarly, the list of criteria 1060 may include other criteria not used in the determination but are shown for presentation purposes. The list of criteria 1060 includes Feedback, Rate, Location and Skills.

The criteria calculation or formula for Skills is based on a number of matches between a client's required skills and a contractor's listed skills. However, a contractor may or may not have one or more required skills for the job exactly specified in his or her profile. However, the system is able to detect a match in skills even if it is not a literal match. For example, if a contractor includes iOS but not Objective C, but the job requires Objective C, the system qualifies this as a skill match, even if it is not a literal match.

As is shown in FIG. 10, it is possible for a contractor who is not distinguished to be listed higher in a list than a contractor who is distinguished. It is possible for all contractors in a list to distinguished (e.g., all proposals are suitable). Likewise, it is also possible for none of the contractors in a list to be distinguished (e.g., all proposals are unsuitable).

The list of interested contractors 1015 can be sorted via a sort mechanism 1060, which allows the list to be sorted based on one or more sorting schemes, including rank score, level, date/time stamp, rate, earnings, location, etc. For example, the list can be first sorted by rank score and, secondly, by mapped level; put differently, if two contractors have the same rank score, the contractor who is mapped to a higher level is listed first. For another example, the list can be sorted, further, by date/time stamp; put differently, if two contractors have the same rank score and the same mapped level, then the contractor who submitted his/her proposal first is listed first.

Mapping Engine

The mapping engine is configured to access historical data to classify or map service providers to a level. The historical data provides guidance regarding whether a contractor with a particular set of factor scores will be selected by a client. For example, the mapping engine determines that the contractor "Cinderelly Creations" has the following set of factor scores—0.9 rate, 0.8 feedback, 0.6 location—and that past contractors with a similar set had a 86% chance of being selected, the mapping engine will map the contractor "Cinderelly Creations" to the "Good Match" level as the "Good Match" level has a 80% threshold. Information regarding client's ultimate selection will become part of the historical data. The mapping engine continuously learns from the historical data to improve future mappings.

Exemplary Architecture

Figure 12:
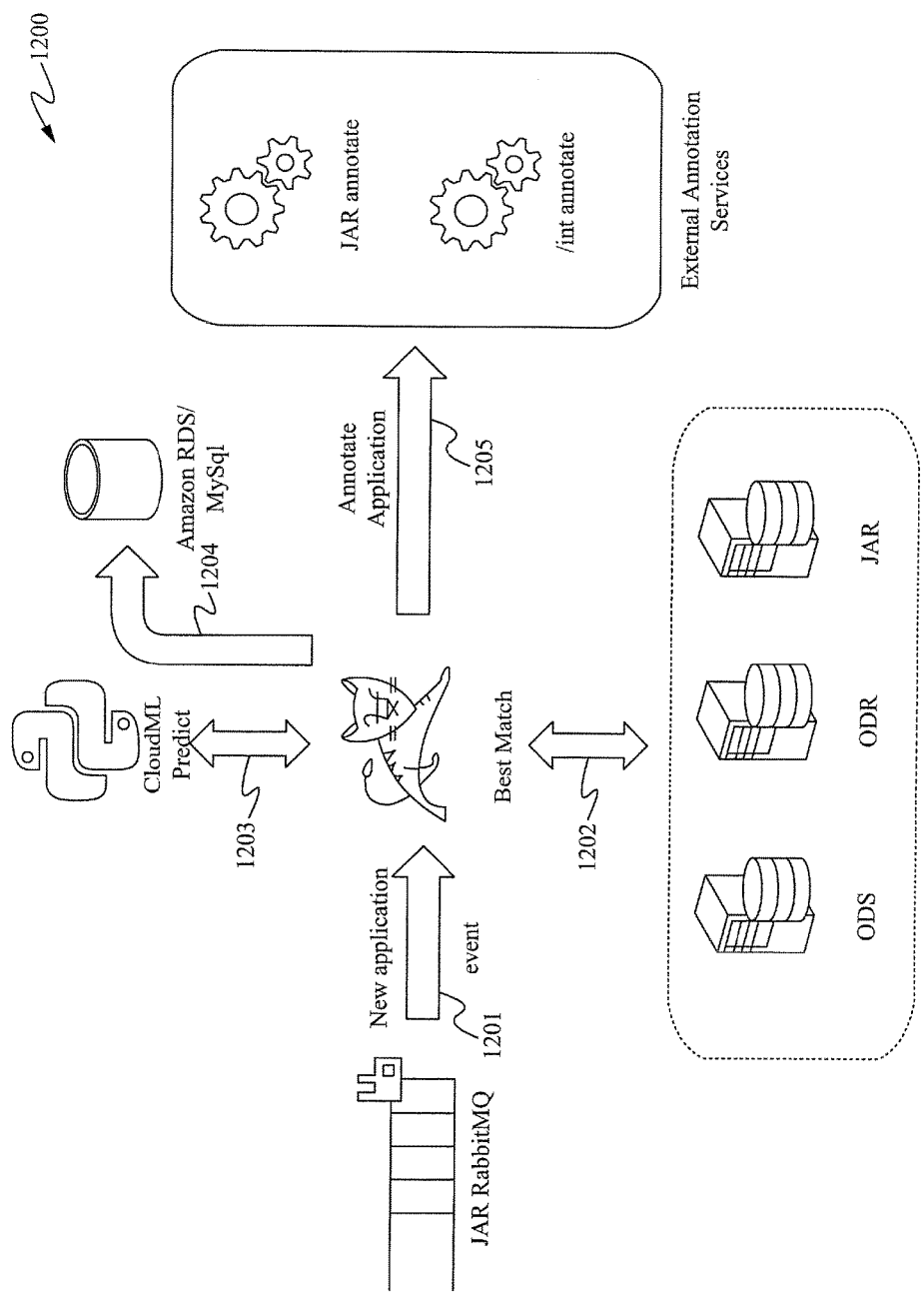
FIG. 12 illustrates another exemplary architecture in accordance with the present invention.

FIG. 12 illustrates another exemplary architecture 1200 in accordance with the present invention. In some embodiments, the mapping engine is implemented using the architecture 1200. Modules of the architecture 1200 can reside on one or more computing devices, such as the computing device 700 of FIG. 7. In some embodiments, one or more modules in FIG. 11 overlap with one or more modules in FIG. 12.

At a step 1201, a Best Match server that runs on the Apache Tomcat™ listens to the JAR's RabbitMQ™ for new applications. As explained above, RabbitMQ™ is an open source message passing system. In some embodiments, each of the new applications corresponds to a proposal submitted by a contractor in response to a job opening. Generally, end user inputs in generating proposals trigger actions that make calls to remote procedures that pass these events to RabbitMQ™. When a new application arrives, a set of different ranking algorithms is used to calculate an application score and/or autohide. In some embodiments, the set of different ranking algorithms requires CloudML.

To calculate a best match score using CloudML, at step 1202, a plurality of profiles are loaded from ODR, ODS and JAR (Job Application Repository) services. The plurality of profiles include an opening profile, an employer profile, a contractor profile, and an application profile. In some embodiments, the opening profile is associated with the job opening. In some embodiments, the employer profile is associated with the client who created the job opening. In some embodiments, the contractor profile is associated with the contractor who submitted the proposal. In some embodiments, the application profile is associated with the proposal.

JAR is a web service that accepts as input a freelancer application identifier and returns the information about the application such as bid, cover letter, and the like. JAR can also return all of the applications for a particular opening. JAR is updated by listening to events that add new applications or change the status of an existing application.

At a step 1203, two calls to CloudML are made using two different models, namely a rank model and an autohide model, to calculate scores and annotations.

At a step 1204, the results from the step 1103 are stored in a database. An exemplary database is the Amazon RDS (relational database services). The Amazon RDS is a MySQL database.

At a step 1205, the results from the step 1103 are also sent to external annotating services. In some embodiments, each proposal is mapped to one of a plurality of levels, and is annotated accordingly, to distinguish the better proposals from the other proposals received in response to the job opening.

ADVANTAGES

Some embodiments of the present invention are directed to ranking interested contractors for a particular job based on a rank score. Each interested contractor's set of factor scores is used to categories the contractor as one of at least two levels to advantageously help a client narrow down the number proposals to review.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A system comprising:
at least one data store configured to maintain profiles of all members, a unstructured data of each of the members, historical data, and a rank model; and
at least one server computer that together is configured to:
receive from a client device a job posting submitted by a client;
receive from a plurality of contractor devices a plurality of proposals submitted by a plurality of contractors regarding the job posting;
in response to receiving the plurality of proposals,
access the at least one data store to retrieve the unstructured data that is specific to the client and to retrieve the profiles associated with the plurality of contractors who submitted the plurality of proposals;
dynamically determine, based on the unstructured data that is specific to the client, a set of parameters that is only pertinent to the client and is to be used by the rank model;
for each of the plurality of contractors, determine, based on the rank model using the set of parameters that is only pertinent to the client and based on the profile for a corresponding contractor, a rank score comprising a set of factor scores; and
present an ordered listing of the contractors according to the rank scores; and
implement a mapping engine configured to:
access the at least one data store to retrieve the historical data; and
for each of the plurality of contractors, compare the set of factor scores associated with the corresponding contractor to past sets of factor scores that are part of the historical data to determine, based on associated data that are part of the historical data and that are regarding whether respective service providers for the past sets of factor scores had been awarded jobs, a percentage of likelihood of being selected for having the set of factor scores and to, thereby, map the corresponding contractor to one of at least two levels based on the determined percentage of likelihood of being selected.

2. The system of claim 1, wherein the at least one data store maintains a machine learning model, wherein the mapping engine implements the machine learning model to continuously learn from the historical data collected by the system to improve future mappings.

3. The system of claim 1, wherein each factor score is based on, at least, a factor weight and a personal factor value, wherein the personal factor value is determined from a criteria calculation that is the same for all members, wherein the personal factor value of a contractor calculated at a first time (T1) is different from the personal factor value of the contractor calculated at a second time (T2).

4. The system of claim 1, wherein the at least one server computer that together is further configured to receive from the client device a selection, wherein information regarding the selection becomes part of the historical data.

5. The system of claim 1, wherein the unstructured data that is specific to the client includes behavioral data.

6. The system of claim 1, wherein the unstructured data includes positive user action.

7. The system of claim 1, wherein the unstructured data includes negative user action.

8. The system of claim 1, wherein the ordered listing of the contractors includes the mapping of each contractor.

9. The system of claim 1, wherein the at least one data store maintains a machine learning model configured to continuously learn from the unstructured data that is specific to the first member to determine data points that are relevant to the first member.

10. The system of claim 9, wherein each in the set of factor scores is associated with one of the data points.

11. A system comprising:
at least one data store configured to maintain profiles of all members, an evolving collection of unstructured data of each of the members, an evolving collection of historical data, and a rank model; and
at least one server computer that together is configured to:
receive from a first end device a request submitted by a first member of all members, wherein the first member is associated with a first type of member;
receive from a plurality of second end devices a plurality of responses submitted by a subset of the members regarding the request, wherein each within the subset of members is associated with a second type of member that is different from the first type of member;
in response to receiving the plurality of responses,
access the at least one data store to retrieve the unstructured data that is specific to the first member and to retrieve the profiles associated with the subset of members who submitted the plurality of responses;
dynamically determine, based on the unstructured data that is specific to the first member, a set of parameters that is only pertinent to the first member and is to be used by the rank model;
for each in subset of members, determine, based on the rank model using the set of parameters that is only pertinent to the first member and based on the profile for a corresponding member, a rank score comprising a set of factor scores; and
present an ordered listing of the members in the subset of members according to the rank scores;
implement a mapping engine configured to:
access the at least one data store to retrieve the historical data; and
for each in the subset of members, compare the set of factor scores associated with the corresponding member to past sets of factor scores that are part of the historical data to determine, based on associated data that are part of the historical data and that are regarding whether respective service providers for the past set of factor scores had been awarded jobs, a percentage of likelihood of being selected for having the set of factor scores and to, thereby, map the corresponding member to one of at least two levels based on the determined percentage of likelihood of being selected, wherein each of the at least two levels are distinguished in the ordered listing; and
receive from the first end device a selection, wherein information regarding the selection becomes part of the evolving collection of historical data.

12. The system of claim 11, wherein the at least one data store maintains a machine learning model configured to continuously learn from the unstructured data that is specific to the first member to determine data points that are relevant to the first member.

13. The system of claim 12, wherein each in the set of factor scores is associated with one of the data points.

14. The system of claim 13, wherein each factor score is based on, at least, a factor weight and a personal factor value, wherein the personal factor value is determined from a criteria calculation that is the same for all members, wherein the personal factor value of a member calculated at a first time (T1) is different from the personal factor value of that member calculated at a second time (T2).

15. The system of claim 13, wherein the machine learning model is also configured to continuously learn from the historical data collected by the system to improve future mappings.

16. The system of claim 15, wherein the unstructured data that is specific to the first member includes behavioral data.

17. The system of claim 16, wherein the ordered listing of the members in the subset of members includes the mapping of each member in the subset of members.

18. The system of claim 11, wherein the ordered listing of the members in the subset of members is displayed in a user interface, wherein each in the ordered listing includes at least one contact feature for directly contacting an associated member without leaving the user interface.

* * * * *